(12) United States Patent
Jehle et al.

(10) Patent No.: US 11,247,158 B2
(45) Date of Patent: Feb. 15, 2022

(54) FILTER SYSTEM FOR A CONTAINMENT THROUGH WHICH A GAS FLOWS

(71) Applicant: Skan AG, Allschwil (CH)

(72) Inventors: Thomas Jehle, Rheinfelden (DE); Volker Sigwarth, Sisseln (CH)

(73) Assignee: SKAN AG, Allschwil (CH)

( * ) Notice: Subject to any disclaimer, the term of this patent is extended or adjusted under 35 U.S.C. 154(b) by 439 days.

(21) Appl. No.: 15/778,166

(22) PCT Filed: Nov. 21, 2016

(86) PCT No.: PCT/CH2016/000145
§ 371 (c)(1),
(2) Date: May 22, 2018

(87) PCT Pub. No.: WO2017/088075
PCT Pub. Date: Jun. 1, 2017

(65) Prior Publication Data
US 2018/0280852 A1    Oct. 4, 2018

(30) Foreign Application Priority Data
Nov. 23, 2015  (EP) ..................... 15405074

(51) Int. Cl.
*B01D 46/00*    (2006.01)
*B01D 46/24*    (2006.01)

(52) U.S. Cl.
CPC ..... *B01D 46/0004* (2013.01); *B01D 46/0091* (2013.01); *B01D 46/2411* (2013.01); *B01D 2279/65* (2013.01)

(58) Field of Classification Search
CPC ............ B01D 46/0004; B01D 46/0091; B01D 46/2411; B01D 2279/65; B01D 46/0005; B01D 2265/022; B01D 46/4272
See application file for complete search history.

(56) References Cited

U.S. PATENT DOCUMENTS 4,826,512 A * 5/1989 Fuller ............... B01D 46/0004
55/283
2007/0093196 A1    4/2007 Morse et al.

FOREIGN PATENT DOCUMENTS

DE    196 20 252 A1    9/1997
EP    2 666 532 A1    11/2013
(Continued)

OTHER PUBLICATIONS

International Search Report and Written Opinion of the International Searching Authority, dated Jan. 26, 2017, in connection with International Application No. PCT/CH2016/000145. (11 pages).

(Continued)

*Primary Examiner* — Robert Clemente
(74) *Attorney, Agent, or Firm* — McCarter & English, LLP (57) ABSTRACT

A filter system for a containment through which a gas flows, comprising at least one filter unit. First docking means on the filter unit removably connect the filter unit to a receiving port of the containment. The filter unit further has a closure element having an adjusting mechanism to block and open an entry into the filter unit. A drive unit can be connected to the adjusting mechanism. The connection between the adjusting mechanism and the drive unit is preferably dockable. The drive unit has a motor preferably in the form of an electric motor with a pinion or a gear. The transmission ratio of the motor to the transmission part is greater than 1:20, preferably greater than 1:30, for example 1:33. A control unit can switch and monitor the position of a plurality of closure elements according to a program. The adjusting mechanism can also be actuated manually.

13 Claims, 13 Drawing Sheets

(56) References Cited

FOREIGN PATENT DOCUMENTS

| | | |
|---|---|---|
| JP | 2009-512830 A | 3/2009 |
| WO | 2010/088782 A1 | 8/2010 |
| WO | WO2010088782 A1 * | 8/2010 ......... B01D 46/0004 |

OTHER PUBLICATIONS

Japanese Office Action dated Oct. 13, 2020, issued in connection with Japanese Patent Application No. 2018-526649, and English translation thereof (4 pages).

* cited by examiner

FILTER SYSTEM FOR A CONTAINMENT THROUGH WHICH A GAS FLOWS

RELATED APPLICATIONS

This application is a U.S. National Phase Application under 35 U.S.C. 371 of International Application No. PCT/CH2016/000145 filed on Nov. 21, 2016, which was published on Jun. 1, 2017 under International Publication Number WO 2017/088075 A1, and which claims the benefit of European Patent Application No. 15 405 074.4 filed on Nov. 23, 2015. The disclosures of these applications are incorporated herein by reference in their entireties.

FIELD OF THE INVENTION

The invention relates to a filter system for a containment through which a gas flows, having at least one filter unit. Provision is made on the filter unit for first docking means which are designed for the releasable connection of the filter unit to a receiving port of the containment. The filter unit also has a closure element which is adjustable by means of an adjusting mechanism and serves for the shutting off and opening of an inlet into the filter unit. As containments, isolators, e.g. for the pharmaceutical-chemical industry, sluices and safety cabinets, e.g. for microbiological operations or operations with toxic substances, are especially applicable. The concept also covers all types of RABS (Restricted Access Barrier System).

PRIOR ART

Known from WO 2010/088 782 A1 is a device with a cartridge-like, exchangeable filter unit for the releasable, locked docking on a containment through which a gas flows. For this purpose, locking elements are arranged complementary to each other on the filter unit and at the access into the containment. The filter unit has a cover which by means of an integrated mechanism which extends axially through the filter unit can be adjusted between a closed and a maximum open position. The mechanism has an end piece, positioned outside the filter insert, which serves for generating a pushing movement of the mechanism and is operated in a rotating manner using a tool, which is to be attached, or by hand. The mechanism also consists of a threaded spindle, which extends centrally from the cover, and a sleeve which accommodates the spindle.

OBJECT OF THE INVENTION

In relation to the previously known prior art, the invent is based on the object of designing handling and operation of filter units installed on containments more efficiently so that their exchange and operation can be achieved in a contamination-proof and time saving manner and conducted accurately in the process. A further object of the invention entails automating the switching and monitoring of the position of all the closure elements especially in the case of a multiplicity of filter systems being installed on a containment.

OVERVIEW OF THE INVENTION

The filter system is designed for a containment through which a gas flows, having at least one filter unit. The filter unit has first docking means which can be used for the releasable connection of the filter unit to a receiving port of the containment. The filter unit also has a closure element which is adjustable by means of an adjusting mechanism and is designed for the shutting off and opening of an inlet into the filter unit. For operating the adjusting mechanism, provision is made for a drive unit which can be connected thereto.

Specific embodiments of the invention are defined as follows: The connection between the adjusting mechanism of the filter unit and the drive unit is of dockable design. For this, provision is made on the filter unit for second docking means and on the drive unit provision is made for connecting means which are complementary thereto. The drive unit comprises a motor for driving a rotatably mounted transmission part and an adapter assembly, connected to the transmission part, which is provided for connecting to the adjusting mechanism.

The motor is an electric motor and has a drive gear. The transmission part is designed as a wheel which is driven by the drive gear. The transmission ratio from the drive gear on the motor to the transmission part is dimensioned to be higher than 1:20, preferably higher than 1:30, e.g. 1:33. The adapter assembly has a driver which is rotatably connected to the transmission part and is designed for engaging with the adjusting mechanism. The drive gear is a pinion with a radially encompassing toothing arrangement. The transmission part has a radially encompassing toothing arrangement which meshes with the toothing arrangement of the drive gear. The adjusting mechanism of the filter unit has on one side an end piece, with a non-circular contour, which is seated on a spindle sleeve, wherein the end piece is for example an externally multi-faceted nut. The driver of the adapter assembly has a complementary geometry for the form fit with the contour of the end piece, wherein the driver is for example internally multi-faceted and encompasses the external multi-faceting of the nut.

The adjusting mechanism of the filter unit extends axially through this and consists of:
a) a spindle rod, which by one end is fixed on the plate-like closure element and the other end of which is designed as a threaded section, preferably with a male thread;
b) the spindle sleeve, preferably with a female thread, which engages with the threaded section; and
c) the end piece which is seated on the spindle sleeve.

The filter unit is cylindrical in principle and consists of:
a) a filter insert of hollow cylindrical design with a hollow interior space and an end face on both sides;
b) a casing, which encloses the filter insert on its outer circumference;
c) a first side cover, which is associated with one of the end faces and encircles the central inlet;
d) the closure element with the adjusting mechanism which is fixed thereon and extends axially through the interior space; and
e) a second side cover, which is associated with the other end face, has a central base which is curved toward the interior space, as a result of which an outwardly opening recess is created, into which recess the end piece projects from the adjusting mechanism.

The adapter assembly comprises the driver, which is connected in a rotation-resistant manner to the transmission part, and also a fixed flange as a support base for the driver and a holder for the fastening of the motor. The connecting means are arranged on the flange on the drive unit side and have the form of grooves with an undercut. The second docking means on the filter unit have the form of locking lugs. The second docking means, together with the coupled connecting means, form a locked end position.

The flange has projecting spring elements which, only in the pressed in state, enable the release of the connecting means from the second docking means from the locked end position. The first docking means are arranged on the first side cover, at the edge of the inlet. The second docking means are arranged on the second side cover, projecting into the recess. The receiving port has an access into the containment, and at the edge of access provision is made for connecting elements for engaging with the first docking means.

Provision is made for a control unit, which serves for the purpose of:
a) controlling according to program, and optionally also logging, switching on and switching off times, activation duration, rotational direction and rotational speed of the motor of the drive unit and therefore indirectly the position of the closure element;
b) limiting the movement of the closure element in the end positions during maximum opening and during correct shutting off of the inlet into the filter unit; and
c) indicating, and optionally also logging, the respectively current position of the closure element.

A multiplicity of filter systems, each consisting of a filter unit and a drive unit connected thereto, are attached to a containment. In this case, the control unit can be individually programmed for the function of each filter system within the sum total of all the filter systems.

The adjusting mechanism can also be operated manually alternatively to the drive unit which can be connected to the filter unit. This is by means of a tool fitted on the end piece or directly by hand.

The most clear-cut advantages of the filter system according to the invention are the releasable couplings of the filter unit to the containment and of the drive unit to the filter unit, the motorized operation of the adjusting mechanism of the filter unit with virtually infinite reusability of the drive unit, the small overall size of the motor which is used, the potential improvement by means of a control unit for controlling and monitoring a filter unit, or particularly a plurality of filter units, and finally the alternative manual adjusting of the position of the closure element on the filter unit.

BRIEF DESCRIPTION OF THE ATTACHED DRAWINGS

In the drawings shows:
FIGS. 8A to 8E—show the phase-wise docking of the drive unit according to—FIG. 6B onto the filter unit according to FIG. 3C, in schematic views.

EXEMPLARY EMBODIMENT

With reference to the attached drawings, the detailed description of the filter system according to the invention for the application field defined above follows below. In this case, it is started on the containment side, then an individual filter unit and drive unit are dealt with in each case and finally the interaction of both devices is taken into consideration.

The following definition applies to the entire further description. If designations are included in one figure for the purpose of graphic clarity but not explained in the directly associated description text, then reference is made to their mentioning in preceding figure descriptions. In the interests of clarity, the repeated description of components in subsequent figures is for the most part dispensed with providing it is graphically clearly discernible that it concerns "recurring" components.

FIGS. 1A to 2B

The embodiment of a containment 1, which is illustrated by way of example, typically consists first of all of a base frame 10 and the housing 11 which rests thereon. Installed on the front side is a plate 12 with, in most cases, a plurality of hand grips 13 in order to enable a view and access into the working chamber 14 which is located inside. Arranged in the roof space of the containment 1 are the inlet air unit 15 and the exhaust air unit 16, wherein depending on plant equipment the inlet air unit 15 can be fed from the free atmosphere or from the installation room and the exhaust air unit 16 leads to there. Each receiving port 17 encircles an access 170 into the working chamber 14 of the containment 1 and has connecting elements 171, here in the form of grooves with a bayonet-type undercut 172, which are systematically distributed in a circular manner around the access 170 (see FIGS. 2A and 2B).

Figures 1A, 1B:
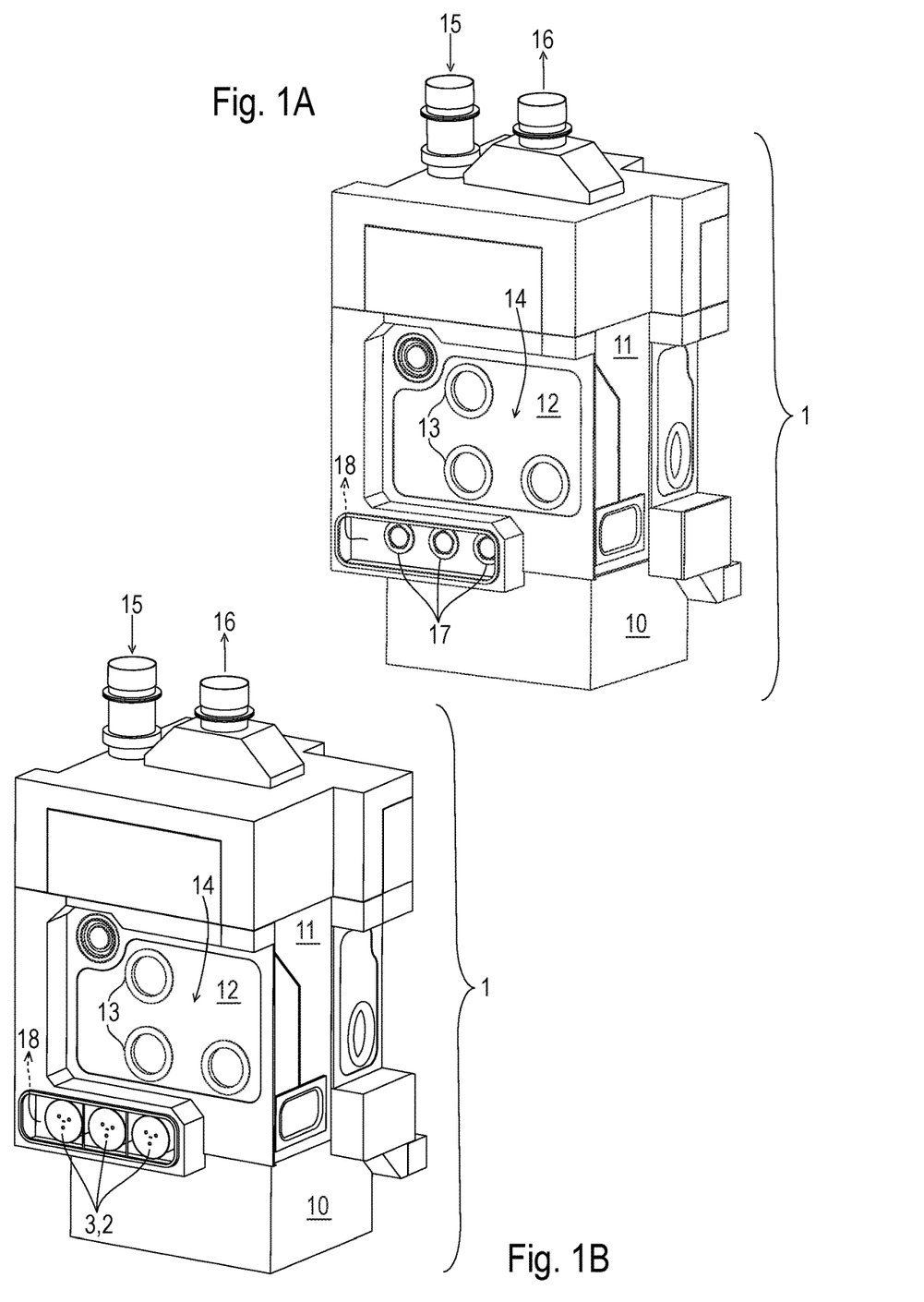
FIG. 1A—a containment, by way of example in form of an isolator, currently without filter units on the unequipped receiving ports, in schematic view.
FIG. 1B—the containment according to FIG. 1A, equipped with filter units on the receiving ports, in schematic view.
Figure 2A:
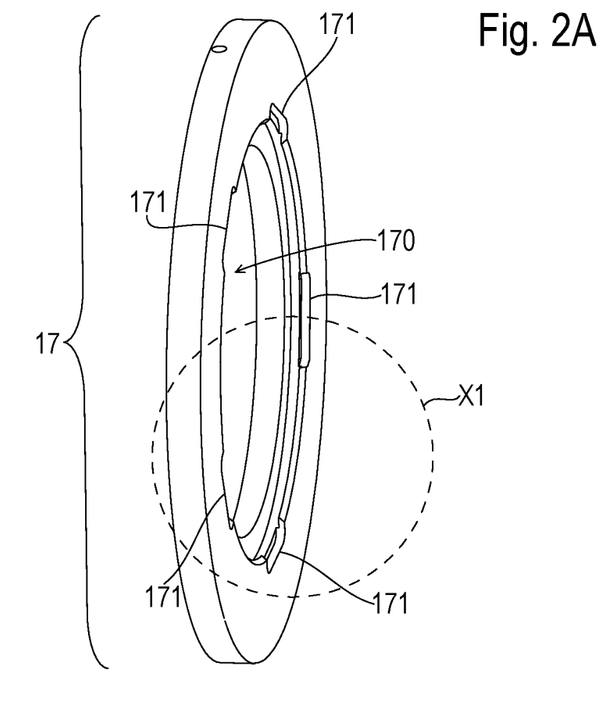
FIG. 2A—a separate receiving port from FIG. 1A, in perspective view.
Figure 2B:
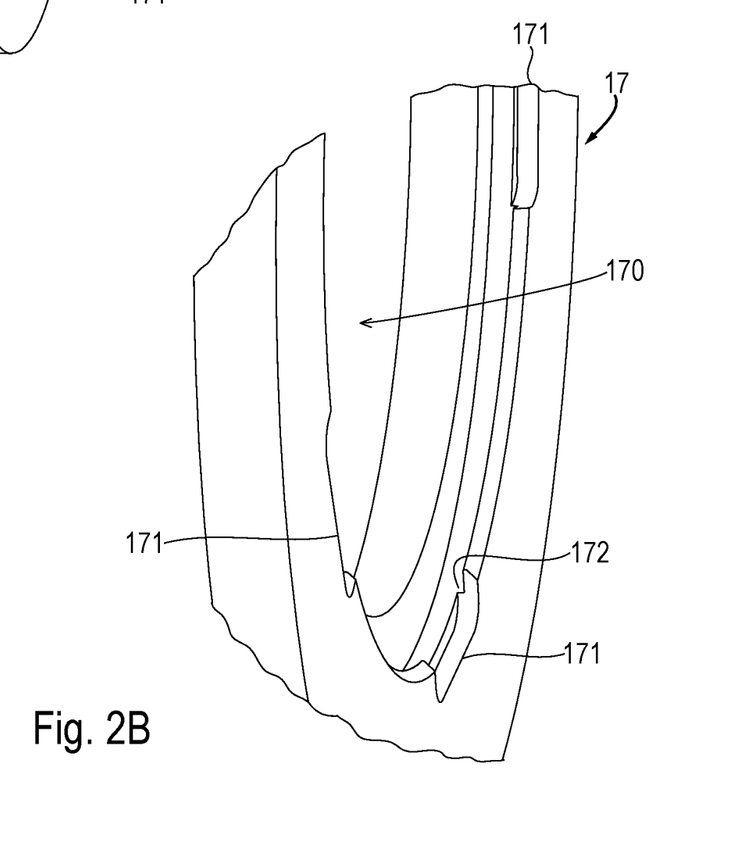
FIG. 2B—the enlarged detail X1 from FIG. 2A.

FIG. 1A

In the depicted version, the containment 1 has three receiving ports 17 which on one side open into the working chamber 14 and on the other side point toward the air circulation passage 18 and initially are still unequipped. For the purpose of a view of the receiving ports 17 the air circulation passage 18 is currently shown as being open.

FIG. 1B

Docked onto the receiving ports 17 is a filter unit 2 in each case, which in its turn is provided with a drive unit 3 in each case. The air circulation passage 18 is also shown to be open toward the front merely for an unrestricted view. During operation of the containment 1, the air circulation passage 18 has to remain closed to the outside and is opened only during the change of the filter units 2 according to corresponding method steps.

FIGS. 3A to 5B

Figure 5A:
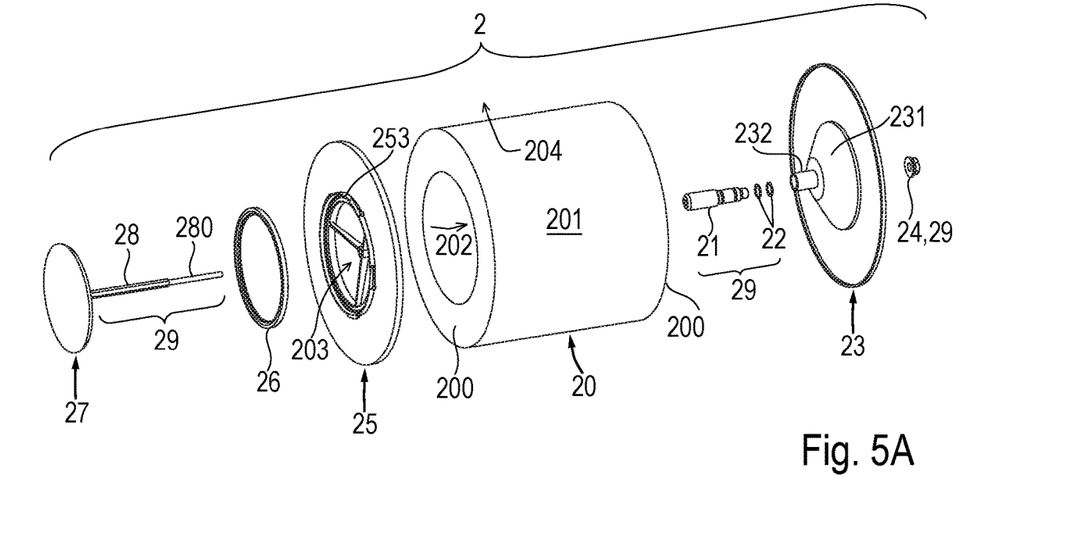
FIG. 5A—the filter unit according to FIG. 1A, in perspective exploded view.
Figure 5B:
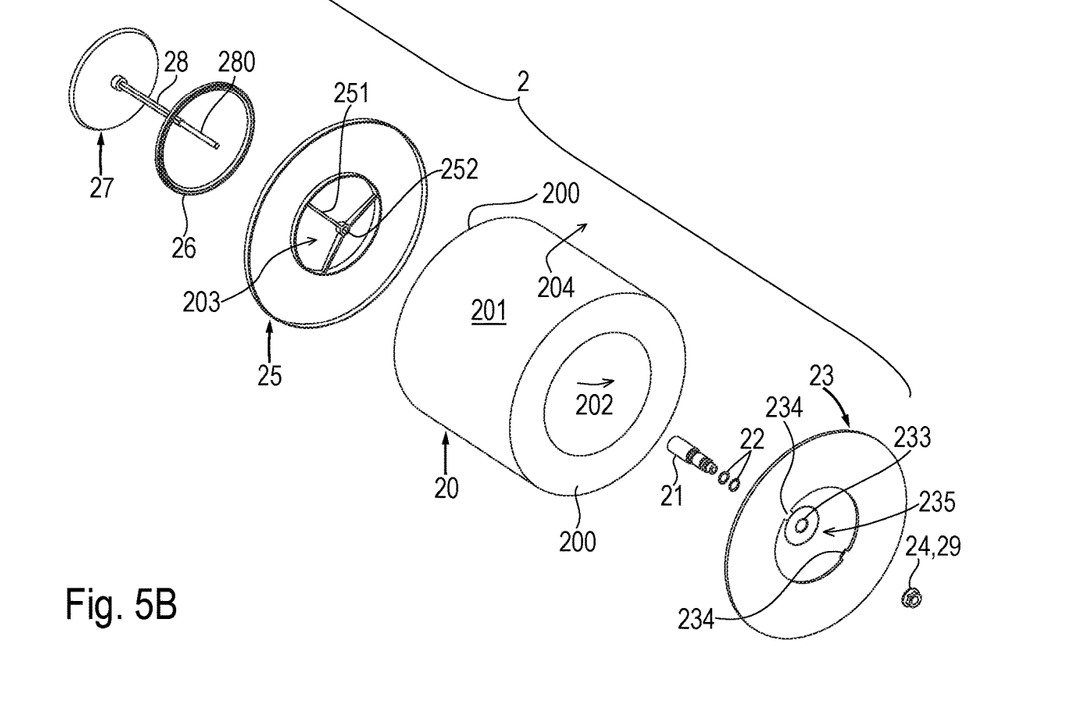
FIG. 5B—the arrangement according to FIG. 5A, in a changed perspective.

The cartridge-like filter unit 2, as seen in the FIGS. pair 5A and 5B from left to right, comprises:
the plate-like closure element 27;
the spindle rod 28, which is part of an adjusting mechanism 29, with the male threaded section 280 formed on its free end, wherein the other end of the spindle rod 28 is fastened centrally on the inner side of the closure element 27 and extends into the filter unit 2;
the second sealing ring 26;
the first side cover 25, which virtually has the form of a ring and encircles the inlet 203 in which is arranged a spoke-like frame 251 with the central bearing 252, and wherein the systematically distributed first docking means 253, here in the form of snap-lock strips, are arranged on the outer circumference of the inlet 203;
the filter insert 20 in the form of a hollow cylinder with the two-sided end faces 200, the radially encompassing casing 201 as the outlet 204 and the interior space 202;
the spindle sleeve 21, also part of the adjusting mechanism 29, which has a female thread and is provided for the two first sealing rings 22;
the second disk-like side cover 23, on the inner side of which provision is made for the base 231, curved centrally toward the filter unit 2, with the sleeve piece 232 seated thereupon, wherein on the outer side, complementary to the bottom surface of the base 231, there is a funnel-like recess 235, arranged on the edge of which are the second docking means 234—here in the form of locking lugs—and on the bottom of which has the through-hole 233; and
the end piece 24, here in the form of a nut with a male hexagon.

Filter Unit 2 in the Assembled State (See FIGS. 3A to 4B)

The following construction is created:
The first side cover 25 is attached to one of the two end faces 200 of the filter insert 20 and the second side cover 23 is attached to the opposite end face 200. The second sealing ring 26 is fixed at the edge of the inlet 203.

The adjusting mechanism 29 extends axially through the interior space 202 of the filter insert 20 and the entire filter unit 2, wherein the spindle rod 28 projects through the bearing 252 in an axially movable and radially fixed manner, the threaded section 280 of the spindle rod 28 engages with the female thread of the spindle sleeve 21, the first sealing rings 22 are seated on the spindle sleeve 21, which rotatably fits in the sleeve piece 232, and the end piece 24 is seated in a rotation-resistant manner on the end of the spindle sleeve 21, which projects from the hole 233, and is sunk in the recess 235.

Figure 3A:
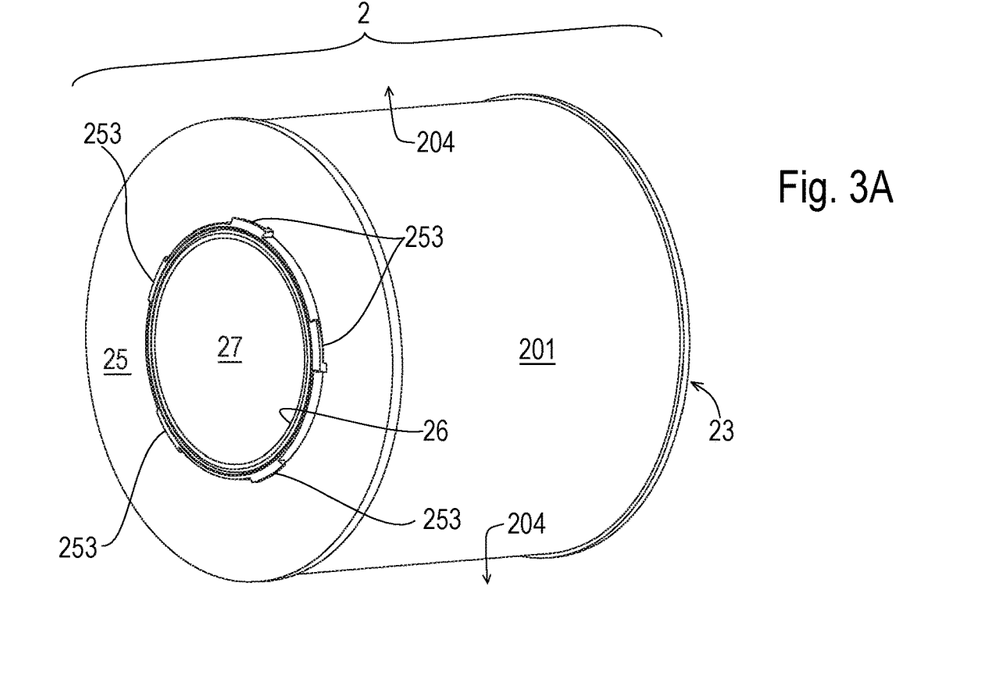
FIG. 3A—a filter unit with a view of the first side cover and with the closure element closed, in perspective view.
Figure 3B:
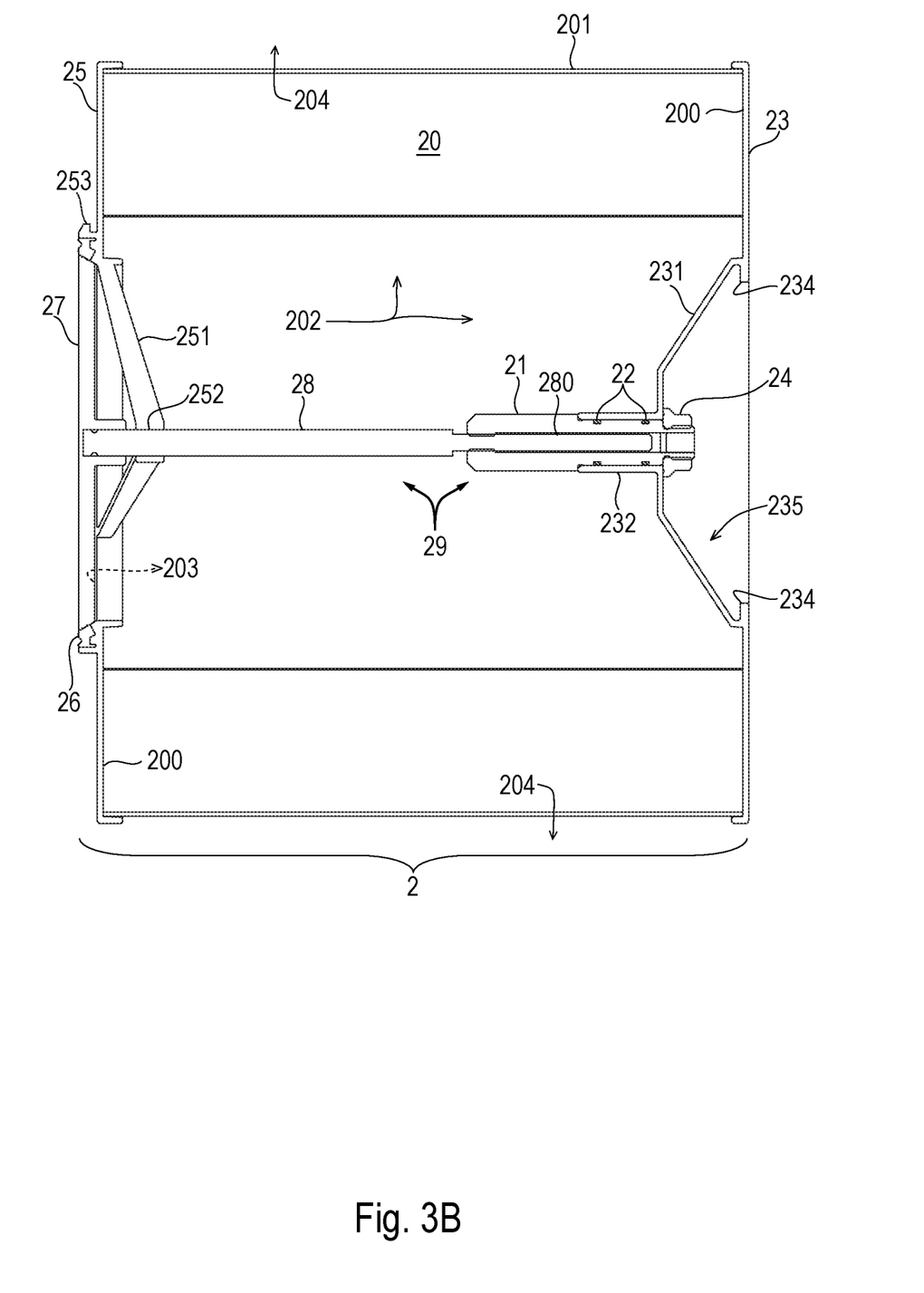
FIG. 3B—the filter unit according to FIG. 1A, with the closure element closed, in vertical section, as a schematic view.
Figure 3C:
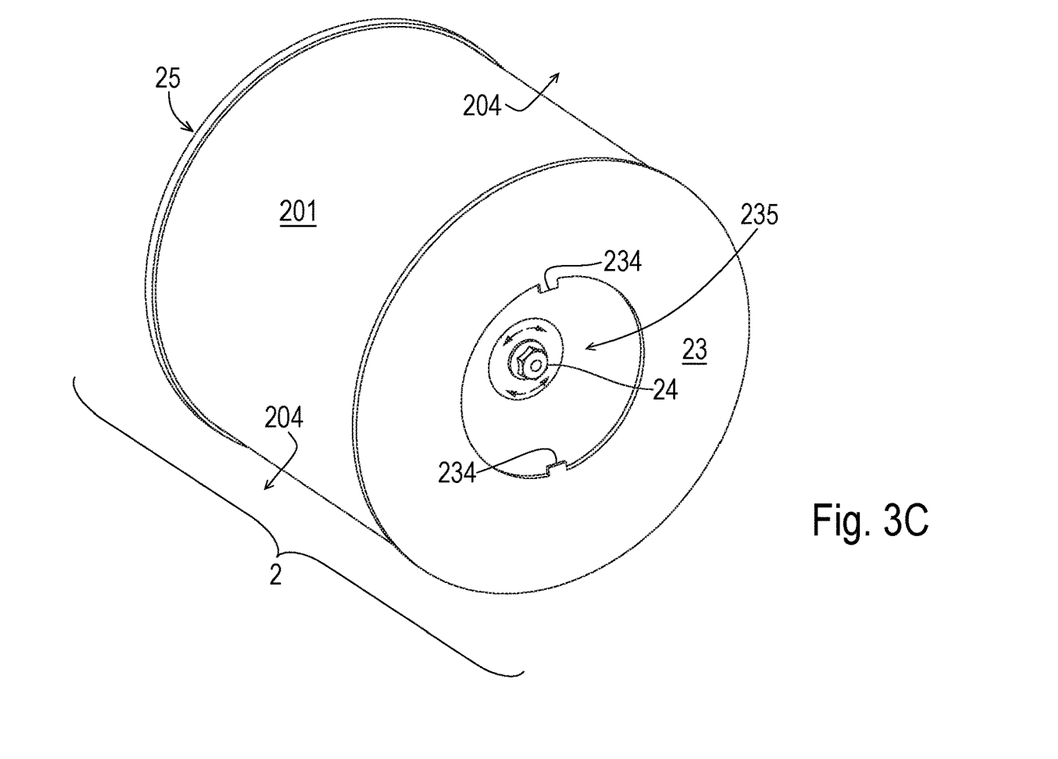
FIG. 3C—the filter unit according to FIG. 1A, now with a view of the second side cover, in perspective view.

Shut-Off Inlet 203 into the Filter Unit 2 (See FIGS. 3A and 3B)

With the inlet 203 fully closed, the closure element 27 is pressed in a gastight manner onto the second sealing ring 26 and the threaded section 280 of the spindle rod 28 is drawn into the spindle sleeve 21 to its maximum. In this state, no gas flow can make its way into the filter unit 2. The inlet 203 is shut off during the storage of filter units 2, during their decontamination, i.e. of the outer surfaces of the closure element 27 during installation on the containment 1, and during a change for the purpose of disposing of used filter units 2.

Figure 4A:
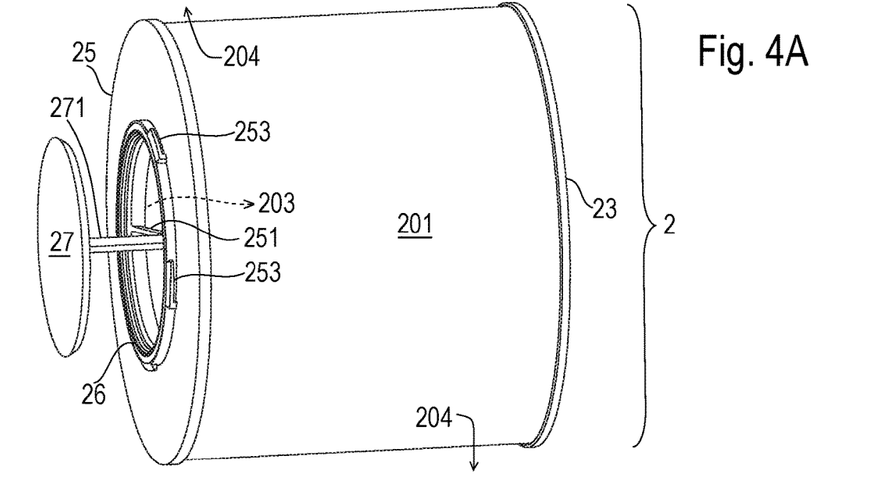
FIG. 4A—the filter unit according to FIG. 1A, with a view of the first side cover and with the closure element open, in perspective view.
Figure 4B:
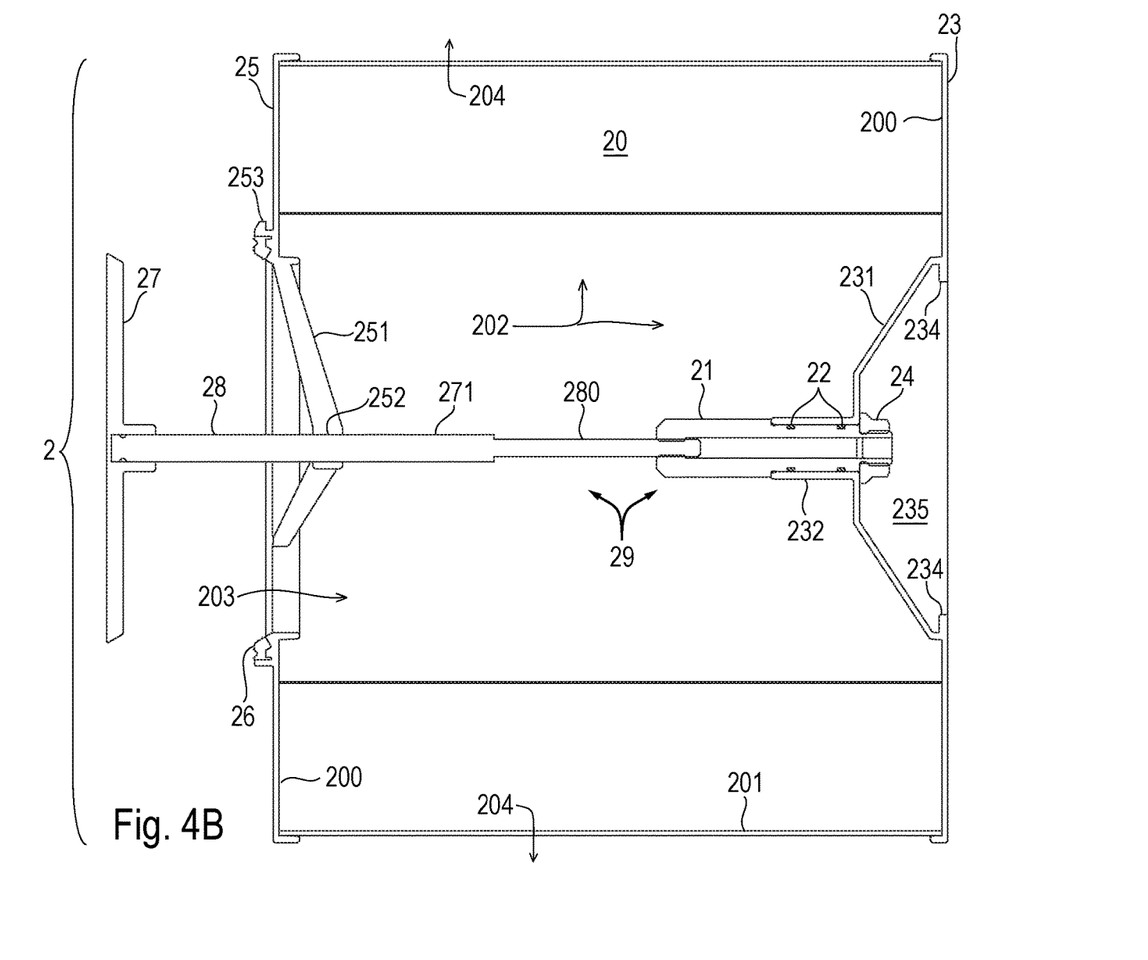
FIG. 4B—the filter unit according to FIG. 1A, with the closure element open, in vertical section, in schematic view.

Open Inlet 203 into the Filter Unit 2 (See FIGS. 4A and 4B)

For creating an open inlet 203, a rotation was executed on the end piece 24 so that the adjusting mechanism 29 was operated, and the closure element 27 is now lifted off the second sealing ring 26. With maximum opening of the inlet 203, the threaded section 280 of the spindle rod 28 now has its minimum engagement in the spindle sleeve 21. Depending on the extent of the open position of the inlet 203—between minimal and maximum opening of the closure element 27—an adequate quantity of gas flow to be cleaned flows from the working chamber 14 of the containment 1 in the operating state into the filter unit 2 which is installed thereon, leaves the filter unit in a cleaned state via the outlet 204 and flows into the air circulation passage 18.

FIGS. 6A to 6E

The drive unit 3, as seen in the FIGS. pair 6D and 6E from right to left, comprises:
first screws 309;
the wheel-like transmission part 30 with the radially encompassing toothing arrangement 300;
second screws 319;
a bracket-like, angled holder 31 with the upper and lower opening 313, 318;
the adapter assembly 39, consisting of a locking element 37 in the form of a spring ring, two bearings 35, a spacer ring 36 between them, also a driver 38 with the inner contour 380 and the axial spigot 381, and finally a flange 32 which has a central through-hole 328, radially disposed connecting means 324, in the form of undercut grooves, and a plurality of spring elements 320 which project from the outer face of the flange 32; and
a motor 33, preferably as an electric motor, with a drive gear 330 in the form of a toothed pinion.

Figure 6A:
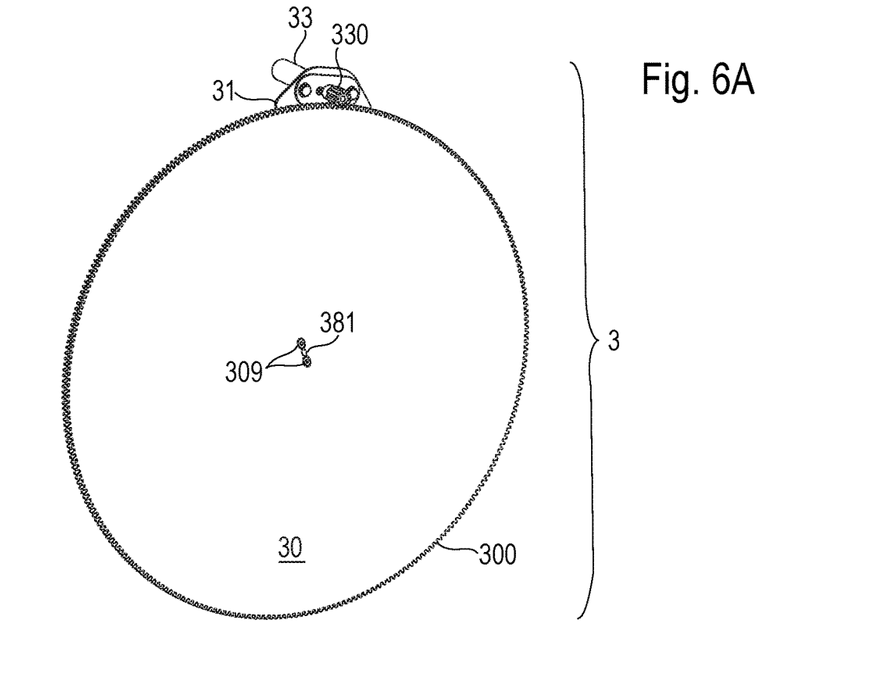
FIG. 6A—a separate drive unit from FIG. 1B, in perspective view.
Figure 6B:
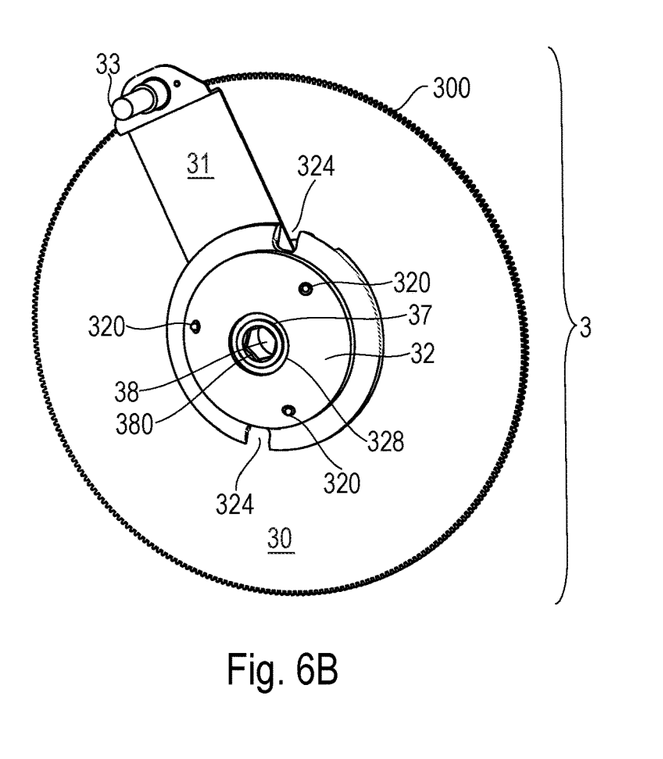
FIG. 6B—the drive unit according to FIG. 6A, in a changed perspective.
Figure 6C:
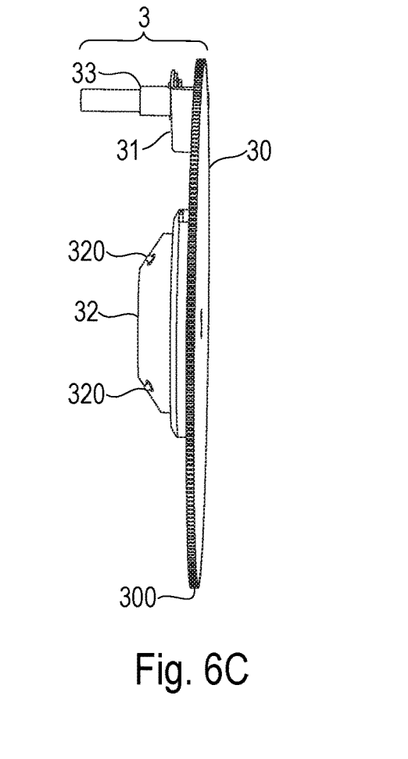
FIG. 6C—the drive unit according to FIG. 6A, in side view.
Figure 6D:
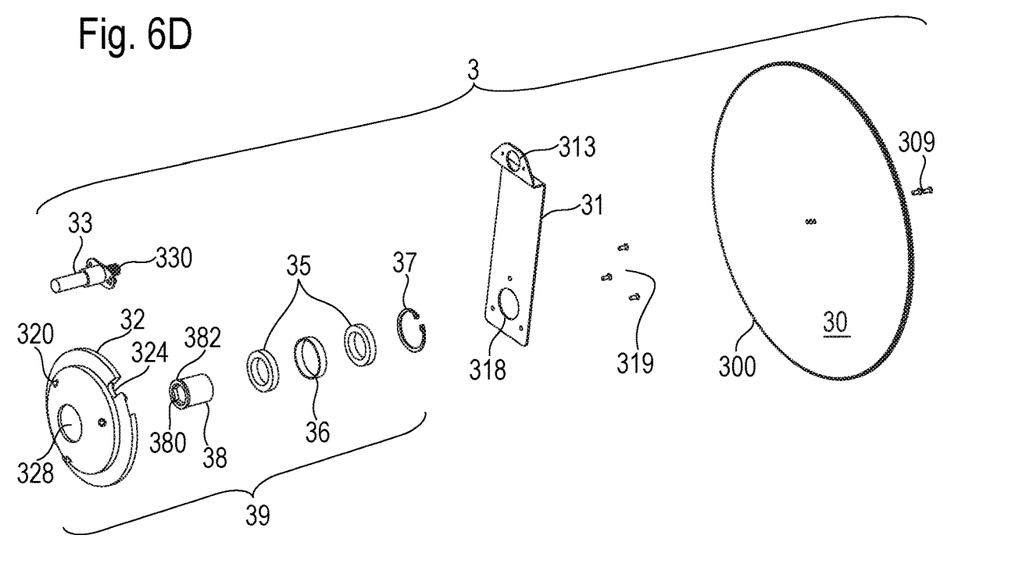
FIG. 6D—the drive unit according to FIG. 6A, in a perspective exploded view.
Figure 6E:
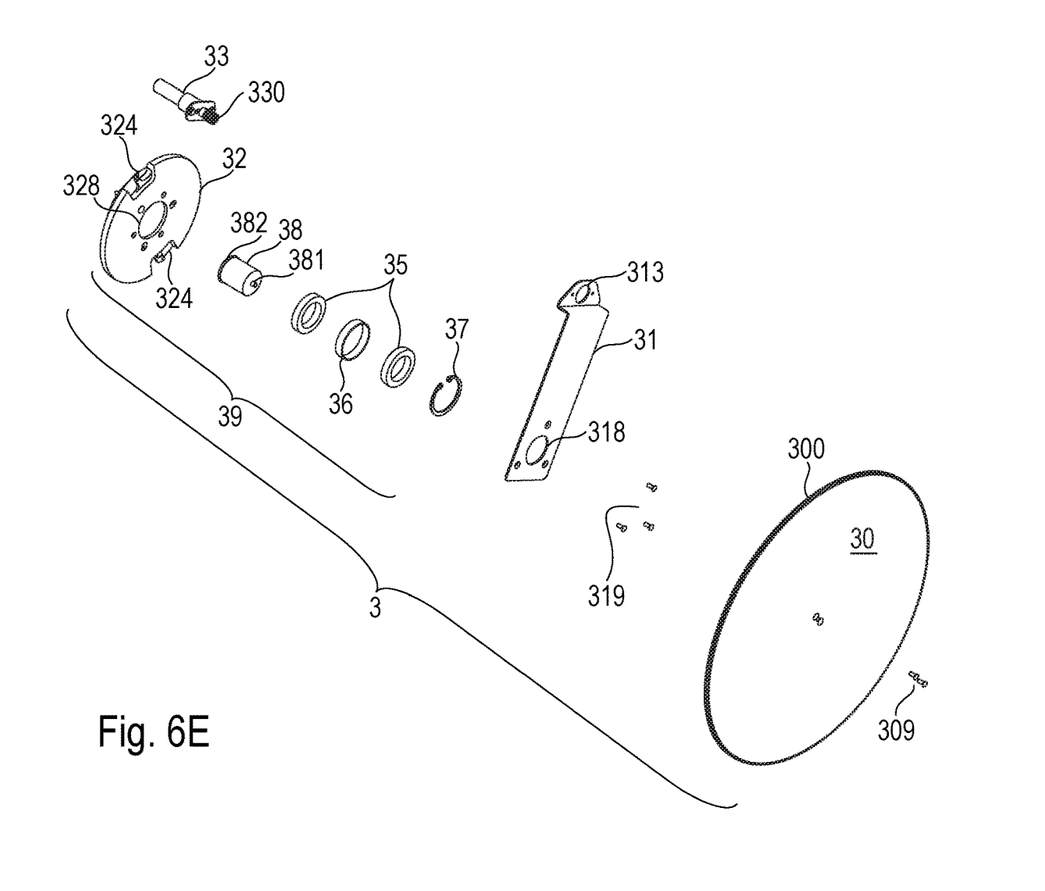
FIG. 6E—the arrangement according to FIG. 6D, in a changed perspective.

Drive Unit 3 in the Assembled State (See FIGS. 6A to 6C)

The following construction is created:
Pushed onto the cylindrical driver 38, against its collar 382, are the first of the two bearings 35, then the spacer ring 36, then the second of the bearings 35 and finally the locking element 37. This arrangement, by means of the collar 382 and the locking element 37, fits axially in a locked rotatable manner in the through-hole 328.

The holder 31 fits by its lower opening 318 on the driver 38 and is fastened on the flange 32 by means of the second screws 319.

The motor 33 is fastened in the upper opening 313 of the holder 31.

The transmission part 30 is fixed on the facing end face of the driver 38 by means of the first screws 309, and its spigot 381 fits in the transmission part 30 with centering effect.

The toothing arrangement of the drive gear 330 of the motor 33 meshes with the toothing arrangement 300 of the transmission part 30. The transmission ratio between the drive gear 330 and the transmission part 30 is dimensioned to be higher than 1:20, preferably higher than 1:30, e.g. 1:33.

With activation of the motor 33—selectively with left hand or right hand rotation
    its drive gear 330 transmits its rotation to the transmission part 30 and sets the driver 38 in equivalent rotation.

FIGS. 7A to 8E

This figure sequence illustrates the phase-wise assembly and the functional interaction of filter unit 2 and drive unit 3. For the preferred installation sequence it is assumed that the filter unit 2 is already docked on a receiving port 17 and therefore the first docking means 253 of the filter unit 2 are locked in a form-fitting and frictionally engaging manner in the connecting elements 171 and their undercuts 172. Therefore, the second side cover 23 with the second docking means 234, which are provided thereon, and the end piece 24, sunk in the recess 235, remain accessible.

First Phase of the Assembly (See FIGS. 7A, 7B, 8A and 8B)

In order to dock the drive unit 3 on the filter unit 2, previously installed on the receiving port 17 of the containment 1, the drive unit 3 with the flange 32 is first of all aligned facing the second side cover 23 until the connecting means 324 of the flange 32 and the second docking means 234 on the side cover 23 are in a position which is congruent to each other.

Figure 8A:
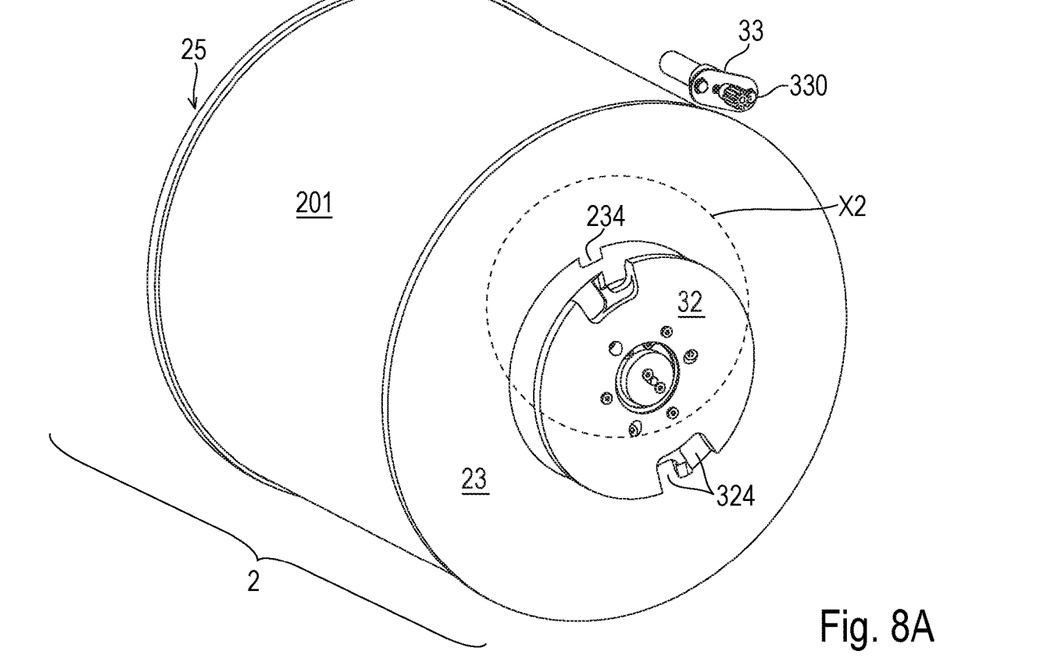
FIG. 8A—the first phase: approach of the connecting means of the flange of the drive unit according to FIG. 6B to the second docking means of the filter unit according to FIG. 30.
Figure 8B:
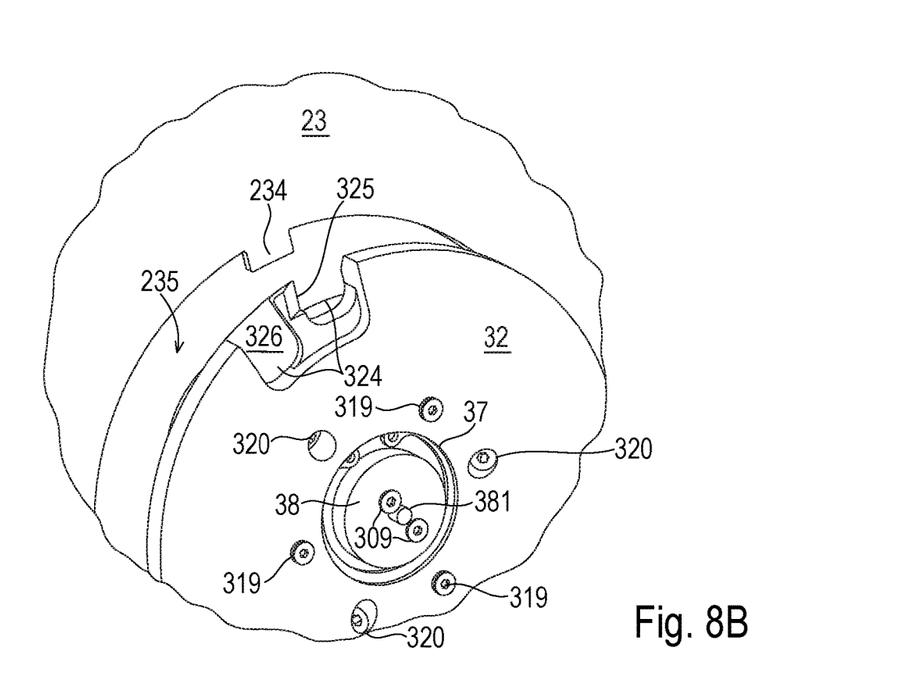
FIG. 8B—the enlarged detail X2 from FIG. 8A.
Figure 8C:
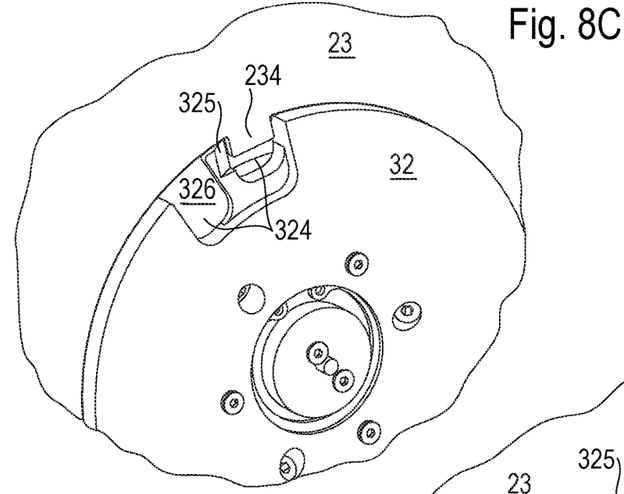
FIG. 8C—the second phase: pushing of the connecting means of the flange of the drive unit onto the second docking means of the filter unit.

Second Phase of the Assembly (See FIG. 8C)

From the previously approximated position, the drive unit 3 is pushed further onto the second side cover 23 so that the second docking means 234 begin to enter the connecting means 324. During this, the flange 32 sinks into the recess 235, the spring elements 320, which project from the flange 32, sit in the recess 235 and the inner contour 380 of the driver 38 begins to enclose the end piece 24 in a form-fitting manner.

Figure 8D:
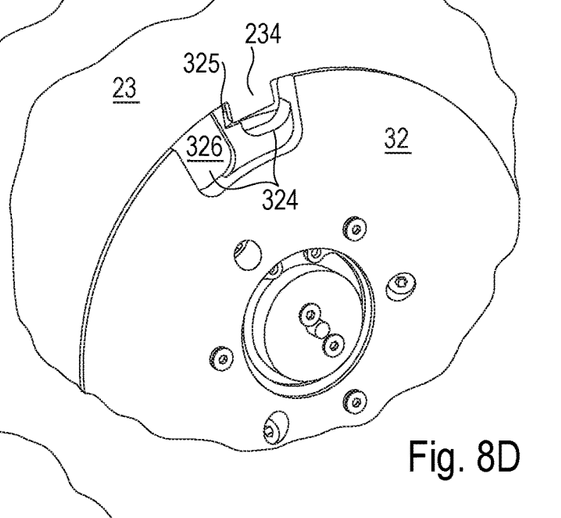
FIG. 8D—the third phase: screwing of the connecting means of the flange of the drive unit onto the second docking means of the filter unit.

Third Phase of the Assembly (See FIG. 8D)

With a rotational movement of the drive unit 3 in the clockwise direction, the second docking means 234 make their way onto bevels 325 of the connecting means 324 and run over these in succession. Therefore, the flange 32 is drawn further into the recess 235, the spring elements 320 are pressed in and the inner contour 380 slides further over the end piece 24.

Figure 8E:
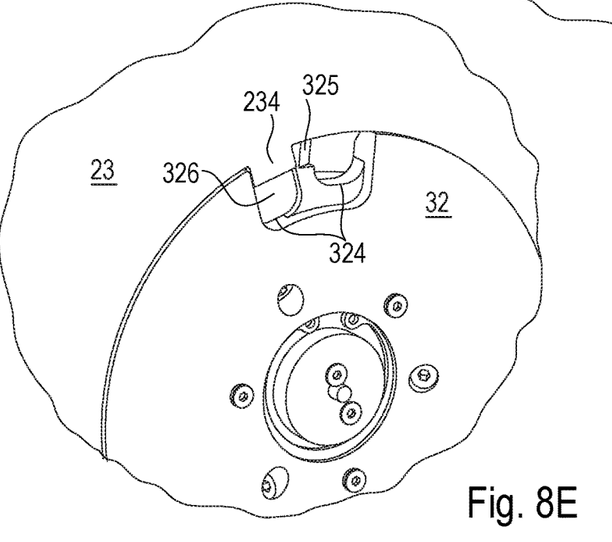
FIG. 8E—the fourth phase: drive unit docked onto filter unit, locked end position.

Fourth Phase of the Assembly (See FIG. 8E)

With further rotational movement of the drive unit 3 in the clockwise direction, the second docking means 234 have completely run over the bevels 325 and as a result of the slightly relaxing spring elements 320, which to a limited extent push the drive unit 3 away from the filter unit 2, latch into the sunken depressions 326. Therefore, the drive unit 3 is docked on the filter unit 2 in a correctly locked manner, and the inner contour 380 of the driver 38 overlaps the end piece 24 to an operationally safe depth.

In order to release the drive unit 3 from the locked connection to the filter unit 2, the drive unit 3 has to be pressed in the direction of the filter unit 2 against the action of the spring elements 320 which project from the flange 32 and sit in the recess 235 so that the depressions 326 release the second docking means 234, and the drive unit 3 can be rotated in the anticlockwise direction until the connecting means 324 can be removed from the second docking means 234.

Figure 7A:
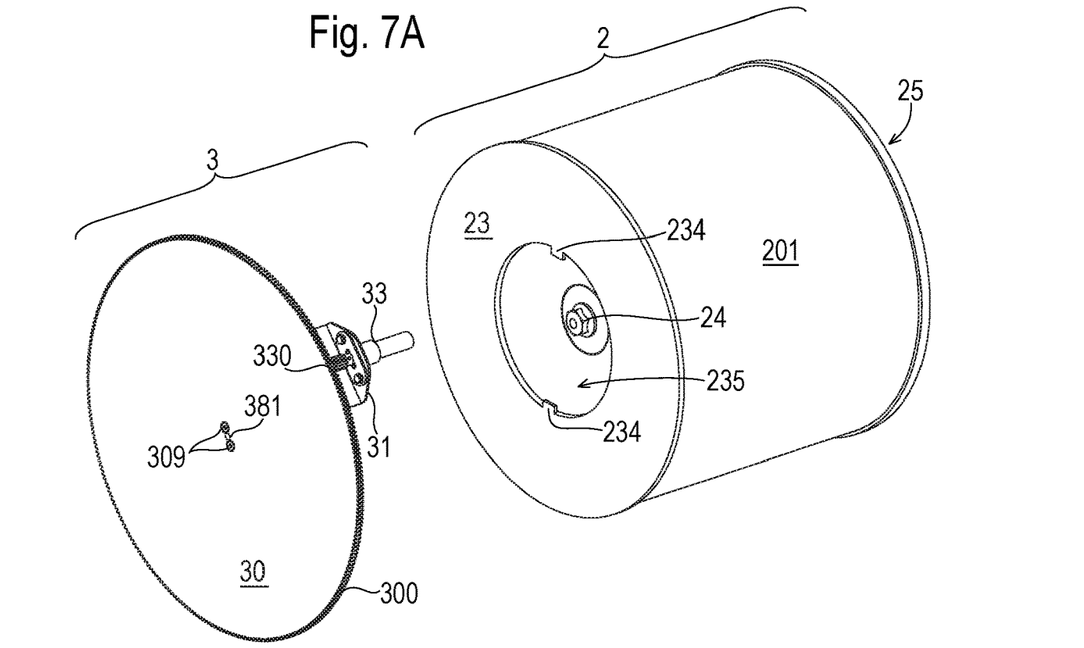
FIG. 7A—the filter unit according to FIG. 3B, with an approximated drive unit according to FIG. 6A, in perspective view.
Figure 7B:
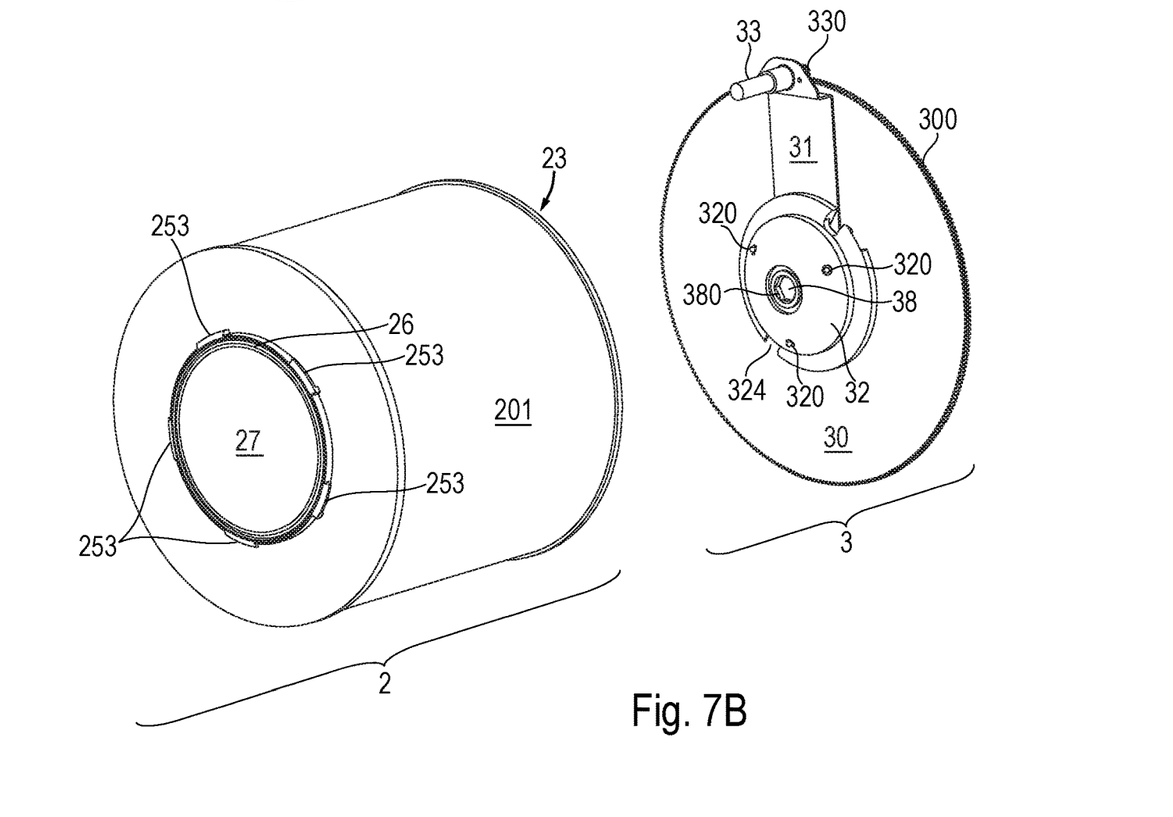
FIG. 7B—the arrangement according to FIG. 7A, in a changed perspective view.
Figure 7C:
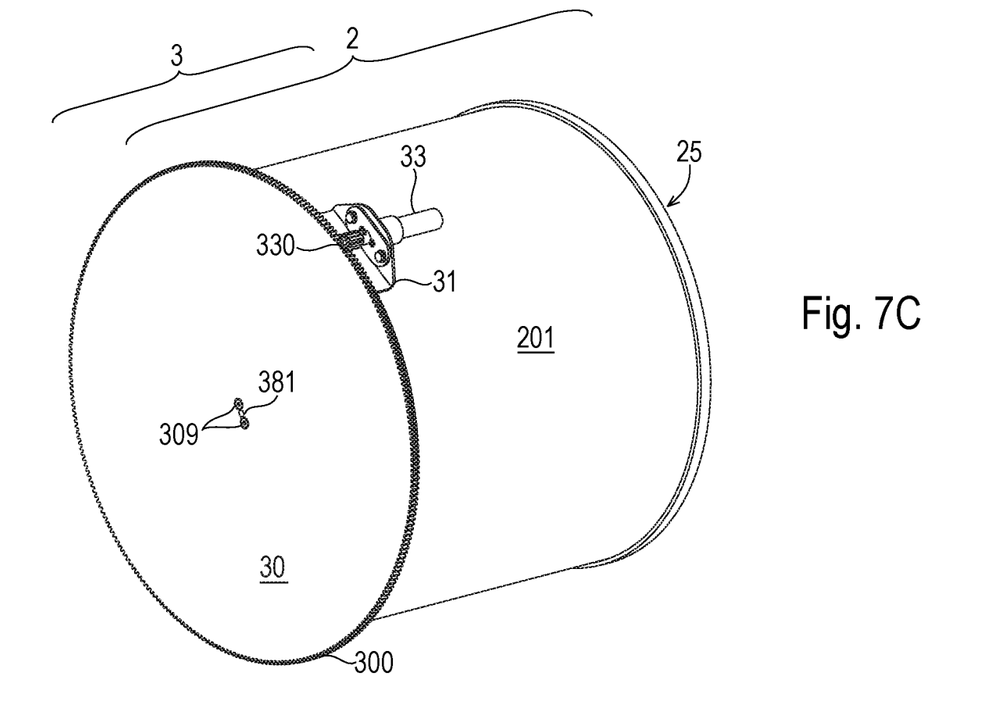
FIG. 7C—shows the arrangement according to FIG. 7A, assembled, in a perspective view.
Figure 7D:
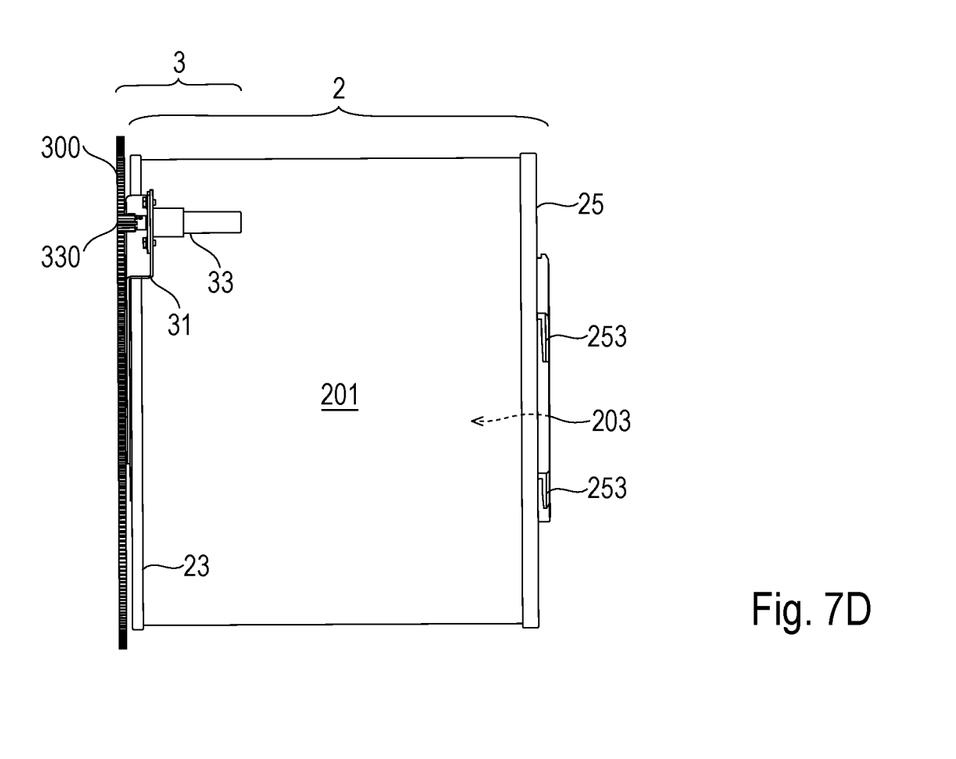
FIG. 7D—the assembly according to FIG. 7C, in side view.
Figure 7E:
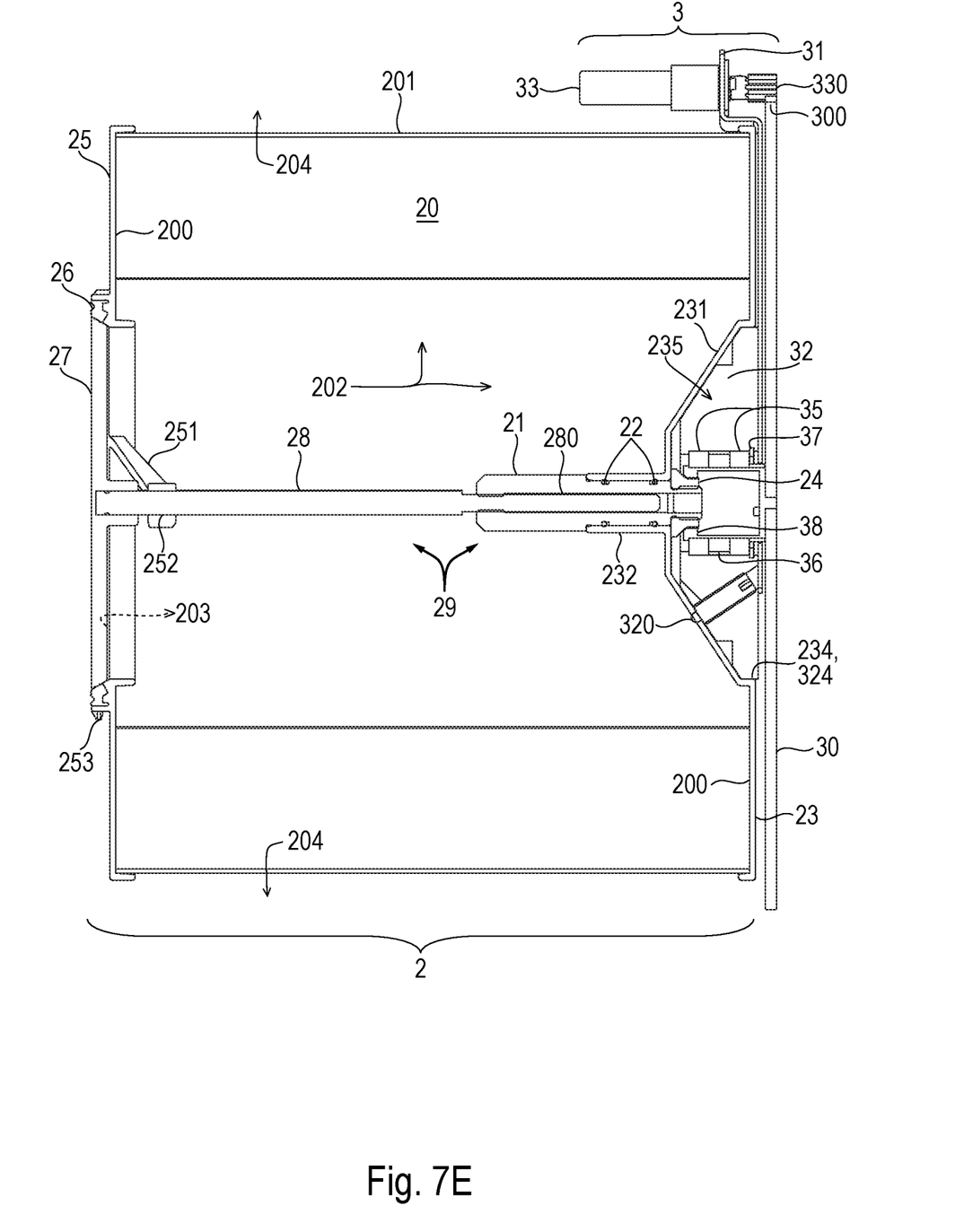
FIG. 7E—the assembly according to FIG. 7D, in mirrored vertical section, in a schematic view.

Interaction of Filter Unit 2 and Drive Unit 3 (See FIG. 7E)

With activation of the motor 33, its thereby rotating drive gear 330 brings the transmission part 30 and the driver 38, which is rigidly connected thereto, into equivalent rotation according to the selected transmission ratio. As a result of the form-fitting coupling between driver 38 and end piece 24, the adjusting mechanism 29 of the filter unit 2 is set in motion; this depends on the selectively engaged rotational direction on the motor 33. If the closure element 27 is located in the completely shut off or maximum open position, its adjustment is merely carried out in the reversible direction or end stops block an exceeding of the travel distance of the closure element 27. If the closure element 27, however, has any intermediate position, the further pushing of the closure element 27 up to the maximum open position or its further retraction into the completely shut off position can be adjusted depending on the switching command for the motor 33.

Improvement with a Control Unit

The filter system according to the invention can advantageously be connected to a control unit which can be used for the purpose of:
    a) controlling according to program, and optionally also logging, switching on and switching off times, activation duration, rotational direction and rotational speed of the motor 33 of the drive unit 3 and therefore indirectly the position of the closure element 27;
    b) limiting the movement of the closure element 27 in the end positions during maximum opening and during correct shutting off of the inlet 203 into the filter unit 2;
    c) indicating, and optionally also logging, the respectively current position of the closure element 27; and
    d) in the case of a multiplicity of filter systems being installed on a containment 1, each consisting of a filter unit 2 and a drive unit 3 connected thereto, to control in an individually programmed manner the function of each filter system within the sum total of all the filter systems.

The invention claimed is:

1. A filter system for a containment through which a gas flows, having at least one filter unit, wherein the filter unit has:
    first docking means, which is designed for the releasable connection of the filter unit to a receiving port of the containment; and
    a closure element, which is adjustable by means of an adjusting mechanism, for the closing and opening of an inlet into the filter unit, characterized in that,
    for operating the adjusting mechanism provision is made for a drive unit which can be connected to the adjusting mechanism;
    wherein the drive unit comprises:
        a motor for driving a rotatably mounted transmission part; and an adapter assembly, connected to the transmission part, which is provided for connecting to the adjusting mechanism;

wherein the motor is an electric motor and has a drive gear and the transmission part comprises a wheel which is driven by the drive gear, the transmission ratio from the drive gear of the motor to the transmission part is dimensioned to be higher than 1:20, and the adapter assembly has a driver which has a rotational connection to the transmission part and is designed to engage with the adjusting mechanism;

wherein the adapter assembly comprises:
the driver which is connected in a rotation-resistant manner to the transmission part; and
a fixed flange as a support base for the driver and a holder for the fastening of the motor;

wherein connecting means, on the drive unit side, are arranged on the flange and have the form of grooves with an undercut, a second docking means on the filter unit has the form of locking lugs, and the second docking means, together with the connecting means, form a locked end position; and wherein the flange has projecting spring elements, which, only in the pressed in state, enable the release of the connecting means to release the drive unit from the second docking means.

2. The filter system as claimed in claim 1, wherein the connection between the adjusting mechanism of the filter unit and the drive unit is provided by way of the second docking means on the filter unit and the connecting means on the drive unit.

3. The filter system as claimed in claim 1, wherein the drive gear is a pinion gear with a radially encompassing toothing arrangement; and
the transmission part has a radially encompassing toothing arrangement which meshes with the toothing arrangement of the drive gear.

4. The filter system as claimed in claim 1, wherein the adjusting mechanism of the filter unit on one side has an end piece, with a non-round contour, which is seated on a spindle sleeve; and
the driver of the adapter assembly has a complementary geometry with the contour of the end piece.

5. The filter system as claimed in claim 1, wherein the adjusting mechanism extends axially through the filter unit and includes:
a spindle rod, which by one end is fixed on the closure element and the other end of which is designed as a threaded section;
a spindle sleeve, which engages with the threaded section of the spindle rod; and
a sleeve piece which is seated on the spindle sleeve.

6. The filter system as claimed in claim 4, wherein the filter unit is generally cylindrical and comprises:
a filter insert of hollow cylindrical design with a hollow interior space and an end face on both sides;
a casing, which encloses the filter insert by its outer circumference;
a first side cover, which is associated with a first end face and encircles the central inlet;
the closure element with the adjusting mechanism which is fixed thereon and extends axially through the interior space; and
a second side cover, which is associated with a second end face, and has a central base which is curved toward the interior space, creating an outwardly opening recess, into which recess the end piece projects from the adjusting mechanism.

7. The filter system as claimed in claim 6 wherein
the first docking means are arranged on the first side cover, at the edge of the inlet;
the second docking means are arranged on the second side cover, projecting into the recess; and
the receiving port has an access into the containment, and connecting elements, for engaging with the first docking means, are provided at the edge of the access.

8. The filter system as claimed in claim 1, wherein
a multiplicity of filter systems, each consisting of a filter unit and a drive unit connected thereto, are attached to a containment.

9. The filter system as claimed in claim 1, wherein the adjusting mechanism can be manually operated alternatively to the drive unit which can be connected to the filter unit.

10. The filter system as claimed in claim 4, wherein the end piece is an externally multi-faceted nut and wherein the driver is internally multi-faceted and encompasses the external multi-faceting of the nut.

11. The filter system as claimed in claim 5, wherein the threaded section of the spindle rod has a male thread and the spindle sleeve has a female thread.

12. The filter system of claim 1, wherein the transmission ratio from the drive gear of the motor to the transmission part is dimensioned to be higher than 1:30.

13. The filter system of claim 12, wherein the transmission ratio from the drive gear of the motor to the transmission part is dimensioned to be 1:33.

* * * * *